(12) United States Patent
Kosanovic et al.

(10) Patent No.: US 7,321,568 B2
(45) Date of Patent: Jan. 22, 2008

(54) REALTIME MANAGEMENT OF PROCESSING RESOURCES

(75) Inventors: Bogdan Kosanovic, Bethesda, MD (US); Charles Fosgate, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 1059 days.

(21) Appl. No.: 10/318,092

(22) Filed: Dec. 13, 2002

(65) Prior Publication Data

US 2003/0081764 A1     May 1, 2003

Related U.S. Application Data

(63) Continuation-in-part of application No. 09/871,775, filed on Jun. 1, 2001, now abandoned.

(51) Int. Cl.
*H04B 3/20*     (2006.01)
(52) U.S. Cl. .................. 370/286; 379/406.08; 718/104
(58) Field of Classification Search .............. 370/236.1
See application file for complete search history.

(56) References Cited

U.S. PATENT DOCUMENTS

| | | | |
|---|---|---|---|
| 5,630,128 A * | 5/1997 | Farrell et al. ............... | 718/103 |
| 5,805,827 A | 9/1998 | Chau et al. | |
| 5,838,968 A | 11/1998 | Culbert | |
| 5,961,585 A * | 10/1999 | Hamlin ........................ | 718/108 |
| 6,055,311 A * | 4/2000 | Dreyfert et al. ........ | 379/406.08 |
| 6,058,114 A * | 5/2000 | Sethuram et al. ........... | 370/397 |
| 6,115,646 A * | 9/2000 | Fiszman et al. ............ | 700/181 |
| 6,182,120 B1 * | 1/2001 | Beaulieu et al. ............ | 709/207 |
| 6,341,303 B1 * | 1/2002 | Rhee et al. .................. | 718/104 |
| 6,370,560 B1 | 4/2002 | Robertazzi et al. | |
| 6,385,638 B1 * | 5/2002 | Baker-Harvey ............. | 718/107 |
| 6,385,639 B1 * | 5/2002 | Togawa ...................... | 709/200 |
| 6,728,223 B1 * | 4/2004 | Litzenberger et al. ...... | 370/286 |
| 6,987,729 B1 * | 1/2006 | Gopalakrishnan et al. .. | 370/230 |
| 6,990,195 B1 * | 1/2006 | LeBlanc et al. ........ | 379/406.08 |
| 7,191,446 B2 | 3/2007 | Kosanovic | |
| 2003/0046396 A1 * | 3/2003 | Richter et al. ............... | 709/226 |

* cited by examiner

*Primary Examiner*—Ramnandan Singh
(74) *Attorney, Agent, or Firm*—Steven A. Shaw; W. James Brady; Frederick J. Teleck, Jr.

(57) ABSTRACT

The invention presents a software agent that optimizes processing resources for multiple instances of a software module that are executing simultaneously. The agent allocates and distributes processing resources, such as MIPS (millions of instruction cycles per second), to software functions executing on a core and controls resource distributions and module functions in a manner such that maximum processing capacity is utilized but not exceeded. The agent schedules the enabling and disabling of software module instance functions using a prioritization scheme that allocates MIPS to functions as the functions are enabled. An exemplary embodiment optimizes MIPS resources for multiple instances of an echo cancellation unit operating on a DSP (digital signal processor) core.

24 Claims, 2 Drawing Sheets ical configuration of the preferred embodiment. The agent 10

REALTIME MANAGEMENT OF PROCESSING RESOURCES

CROSS-REFERENCE TO RELATED APPLICATIONS

This application is a continuation-in-part of and claims priority under 35 U.S.C. 120 to U.S. patent application Ser. No. 09/871,775, for REALTIME EMBEDDED RESOURCE MANAGEMENT SYSTEM, filed on Jun. 1, 2001. now abandoned.

FIELD OF THE INVENTION

The present invention relates to the realtime management of processing resources via algorithms and state control of multiple instances of software functions in a digital processor.

BACKGROUND OF THE INVENTION

Existing methods of managing processing resources of multiple instances of software functions running simultaneously include time slicing and background processing. When total processing capacity is reached or surpassed, these methods prioritize processing operations by executing high priority functions in the foreground in realtime with lower priority functions executing In reply to: the background after the foreground functions are completed. An Echo cancellation unit (ECU) typically has multiple instances running over one or more channels. The processing methods in the prior art allocate MIPS (millions of instructions per second ) to ECU instances that may not require them or are not executing priority functions. Time slicing allocates processing resources to all functions or instances, whether or not processing resources are required for a particular instance or function. Furthermore, the number of simultaneous instances is limited directly by processing resources.

What is needed, therefore, is a realtime application for an ECU that redistributes processing resources among ECU instance functions based on ECU state information, state resource requirements, and available processing resources so as to optimize aggregate ECU instance performance without exceeding the total processing resources.

SUMMARY OF THE INVENTION

There is described herein a technique that manages processing activity by a digital processor to increase both the aggregate performance of software modules as well as the number of simultaneous instances by distributing processing resources among the module instance functions. The present invention is embodied as an agent in a system that has multiple instances of the same software module or modules that execute on a processor core. The agent distributes processor resources among the multiple instance functions, to maximize resources of the core. Examples of processing resources include MIPS (millions of instructions per second) resources of DSPs (digital signal processors), microcontrollers, or ASICs (application-specific integrated circuits).

The preferred embodiment is implemented on a DSP and optimizes PROCESSING resources for multiple instances of software modules operating on a processing core. Without the agent, the contemporaneous execution of the multiple instances would exceed the processing capacity of the core. Therefore, higher densities of instances and functions running on a core are possible by monitoring, allocating, and scheduling processing resources using the agent. The advantages of the present invention include a way to control algorithms that have different states, with each state having different resource requirements, to save processing resources such as MIPS.

An alternative embodiment manages processing resources for multiple instances of an echo cancellation unit (ECU) and redistributes resources to improve the aggregate performance over all instances of the ECU. The embodiment uses a software agent to control functions of multiple instances of an ECU and monitor system states so that ECU functions are enabled and executed in a manner that best utilizes core MIPS. An echo canceller algorithm is separable into distinct functions that are manageable such that the functions can be turned on, off, or slowed. The agent can control the way processing resources are allocated by controlling functions, thereby conserving MIPS where they are not needed and redistributing those MIPS to other functions of the ECU, either in the same or different instances. The processing requirements for some ECU functions will vary with respect to time. Without control over function processing, MIPS allocation to ECU instance functions may be over or under estimated. The agent controls echo cancellation functions in realtime, thereby providing an increase in the functionality of ECU instances without exceeding realtime maximum processing capacity.

BRIEF DESCRIPTION OF THE DRAWINGS

Preferred embodiments of the invention are discussed hereinafter in reference to the drawings, in which.

DETAILED DESCRIPTION OF THE INVENTION

Figure 1:
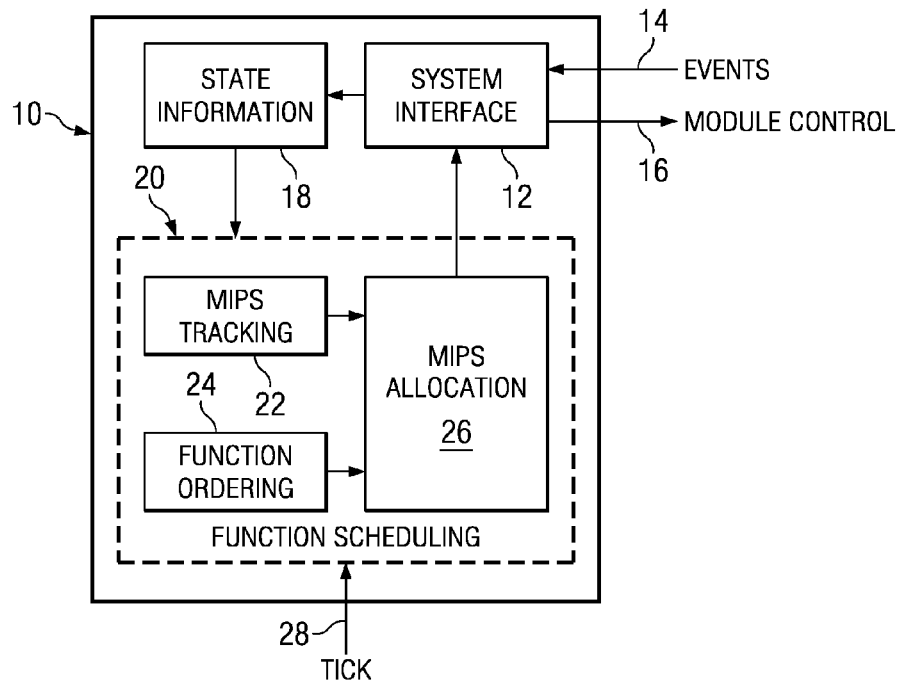
FIG. 1 is a diagram of function blocks for the software agent of the exemplary embodiment.

FIG. 1 is a block diagram illustrating the functional configuration of the preferred embodiment. The agent 10 comprises six functional modules represented as blocks system interface 12, state information 18, and a function scheduler 20 that comprises MIPS (millions of instructions per second) tracking 22, function ordering 24, and MIPS allocation 26. The system interface 12 is the interface between the agent 10 and external software modules. The system interface 12 fields events 14 from software module instances and externally controls modules 16 and instance functions within those modules. Upon reception of an event 14, the agent 10 seizes control, handles the event, and then returns control to the calling function. The events fielded 14 are asynchronous and can occur at any point during operations. Information about the system and those modules comprising the system is gathered through the system interface 12 and sent to state information block 18. The system interface also receives information from MIPS allocation block 26 regarding allocation of processing resources to module instance functions. System Interface block 12 communicates with external modules 16 to turn modules on, off, or adjust their speed of execution to distribute available processing resources. When the system interface receives events 14, it sends the information gathered about the event to the state information block 18.

State information block 18 receives and stores information from events concerning distinct modules or the entire system. Information includes type of codec, system state changes, and other module events. Block 18 stores any system and state information for both the system and the module that influence system processing resources. When multiple instances of a module are running on a core, information that determines consumed processing resources for each module instance are received through system interface 12 and stored in the state information block 18.

State information is passed to the function scheduler 20, which as stated previously, includes MIPS tracking 22, function ordering 24 and MIPS allocation 26 blocks. MIPS tracking block 22 tracks an estimate of total system processing resource requirements in real time and receives state information regarding changes in the amount of processing resources available for instance module functions. MIPS tracking block 22 then adds together the processing resources consumed by the system overhead, codec, specific modules, and subtracts the consumed MIPS from the total available processing resources on the core to determine the amount of resources available for execution of additional instance functions. The processing resources are estimated based on resource consumption lookup tables for each function.

Figure 2:
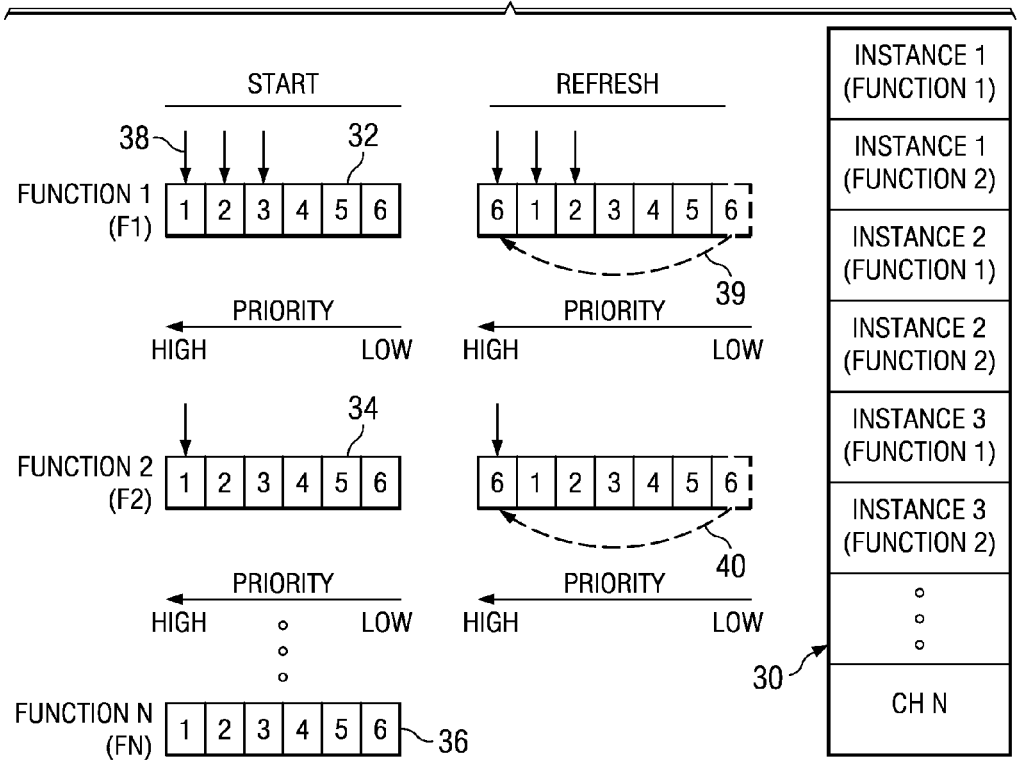
FIG. 2 is a diagram of a function scheduling queue.

Function ordering block 24 prioritizes functions from multiple instances of a program that are operating within a software module. In the preferred embodiment, the ordering is performed using a prioritized round robin scheme. Reference is made to FIG. 2, which illustrates an exemplary diagram of the method for function ordering. Block 30 represents a DSP (digital signal processor) having instances 1 through 3 that represent multiple instances of an application or algorithm operating on the DSP. Instances continue up to N instances 31. Each instance has functions that are enabled according to a function ordering algorithm. As an example, instance functions are grouped into queues F1 (Function 1) 32, F2 (Function 2) 34, which could continue up to FN (Function N) 36. The function algorithm determines priorities and order for each function in each queue, from highest to lowest priority. In F1 and F2, numbered slots within each queue correspond to functions from multiple instances. Function instances in queue F1 (32) are numbered 1, 2, 3, 4, 5, 6 in order from highest to lowest priority and functions in queue F2 (34) are similarly numbered 1, 2, 3, 4, 5, and 6 in order of highest to lowest priority.

Function ordering block 24 enables functions according to a refresh rate, which must be an integral multiple of the timing tick 28. A tick is the smallest unit of time for the agent of the present invention. Function scheduling block 20 receives tick 28 at a configurable period, for example every frame of samples to be processed. After N ticks (configurable), the states of the module are reviewed for changes. When the function scheduling block 20 reaches a refresh time, it notifies the function ordering block 24 to refresh all active queues.

In the round-robin ordering scheme, instance functions are enabled when they both have priority in the function queue and are allocated processing resources by the MIPS allocation block 20. As a function reaches the end of the queue it accordingly has lowest priority. The function's priority subsequently jumps from lowest to highest on the next round robin circular queue shift. The remaining functions in the queue shift to lower priorities. In FIG. 2, queue F1 instance functions 1, 2, and 3 are enabled, as designated by arrows 38. Instance number six occupies the lowest priority position and will have highest priority upon the next circular queue shift. Upon refresh, instance six moves 39 to the highest priority at the beginning of the queue, and is subsequently enabled. In the example, only three instances are enabled at any one time, therefore instances six, one, and two are enabled and instance number three is disabled as it moves to a lower priority position.

FIG. 2 shows Function 2 (F2) 34 in a similar round-robin ordering scheme to queue F1 (32). F2, in this example, will only receive enough processing resources for a single instance function at each tick. F2 begins with instance one enabled, designated by arrow 33. At the refresh, instance six moves 40 to highest priority at the beginning of the queue and is enabled. Instance one is disabled as it moves from highest priority, now occupied by instance six, to the next lower priority position in the queue.

MIPS allocation block 26 steps through all active queues and sequentially controls each function instance via the system interface 12 according to the current availability of processing resources. Upon each refresh the system interface 12 enable instance functions as instructed by the MIPS allocation block 26 in prioritized order based on resource availability as specified by the MIPS tracking block 22. All remaining instance functions that no longer have priority are subsequently disabled. The method and rate of instance functions control in each queue is configurable. Some queues may not enable the same number of functions at the same rate. A ratio can be used to enable instance functions by alternating between queues at each refresh according to a prescribed ratio of enabled functions. For example in queues F1 and F2, for every three instance functions enabled in queue F1, one instance function in queue F2 is enabled. Enablement within function queues continues in order of their ratios in the prescribed manner until the MIPS allocated for the module function execution, as specified by MIPS tracking block 22, is reached or exceeded. As one skilled in the art will recognize, the ratio of enabled functions is exemplary and alternate algorithms for ordering could vary the ratio between enabled functions in different queues.

In addition to the round-robin scheme for ordering function queues, the MIPS allocation block 26 can apply exceptions to the ordering rules. For example, if there is a prescribed ratio of enabling functions between queues, such as four functions in F1 to one function in F2, and all functions in F1 are enabled, then all remaining instance functions in F2 may be enabled up to the allotted processing resources, regardless of priority or enabling ratios. Another exception is the situation in which the MIPS tracking block 22 indicates that an inadequate amount of processing resources remain to execute any further functions from a first queue. If a second queue has functions that, due to their smaller requirements, can be enabled and executed within the remaining allocated processing resources, then functions from the second queue are enabled and executed up to the capacity of the system, even though they may have lower priority. As each instance function in each queue is flagged to be enabled, MIPS allocation block 26 signals the system interface block 12 to control the instance function as required.

An alternative exemplary embodiment of the present invention is an agent that allocates processing resources, such as MIPS, for an echo cancellation unit having multiple channels of speech. The cause of line echo in telephone networks is an analog device called a 2-to-4 wire hybrid. The traditional hybrid is a pair of transformers that use inductive coupling to split a duplex signal into two simplex signals. To reduce the cost of wiring between the central office and the telephone set at the subscriber site, the electrical connection is via a 2-wire line, whereas the connection in the central office uses four wires. Hybrids are physically located at a telephone system's central office. In the old telephone set, the hybrid was realized by means of a tuned transformer. Due to the impedance mismatch between the hybrid and the telephone line, some of the signal transmitted from the 4-wire side returns and corrupts the signal, generating an echo that may be very disconcerting in voice communications. While the echo in human communications can be tolerated, in modem communications it can be catastrophic. To solve this problem, the telephone companies employ a device called an echo canceller. This device is generally employs an adaptive filter that adjusts its coefficients to match the impulse response of the physical hybrid. An echo cancellation unit (ECU) is placed in the telephone network as close to the source of the echo as possible to remove echo from the lines.

Figure 3:
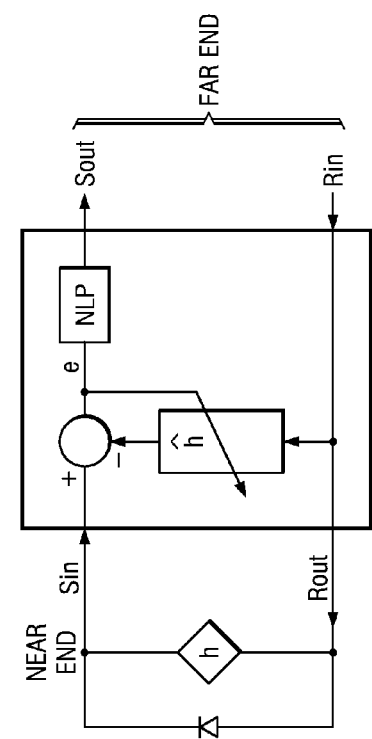
FIG. 3 is a diagram an echo cancellation unit in the prior art.

As illustrated in FIG. 3 a typical ECU can be represented as a quadripole connected as shown, where Rin stands for the Receive-In port, Rout for the Receive-Out port, Sin for the Send-In port, and Sout for the Send-Outp, as stated in ITU-T G.165. An echo canceller is typically a transversal filter, with the far-end speech signal, Rin, as the reference input and a near-end input, Sin. The Sin signal, y(n), consists of two components: the echo of the reference signal, r(n), and the near-end speech signal coming from party B, s(n). The output of the filter is the estimated echo, r_hat(n). The estimated echo is subtracted from the near-end signal, y(n). The difference, called the error signal e(n), is fed back into the echo canceller and used to adapt the coefficients of the transversal filter. The objective to the coefficient adaptation process is to minimize the average Mean-Squared Error between the actual echo and the echo estimate. A Least Mean Squares (LMS) method may be applied with the filter coefficients adapted every sample or every block of M samples. Using a step size or loop gain parameter on the error feedback, the convergence performance of the adaptive filter may be adjusted. There are a number of ways that line echo cancellers may be implemented. Two of the most prominent are the LMS and block-LMS algorithms.

Referring to the agent diagram in FIG. 1, system interface block 12 can control external functions for the purpose of regulating MIPS consumption. The system interface 12 fields externally generated ECU events and performs event-specific processing. Upon reception of an ECU event 14, system interface 12 seizes control, sends data from the event to state information block 18, and if necessary controls an external module 16 based on instructions from function scheduling 20. Controls include enabling or disabling specific ECU functions. Each event is fielded and handled asynchronously, and no event queue is used to store events for scheduled processing.

State information block 18 is where state information for each operating ECU instance is stored. Stored information includes the background filter information, foreground filter information, search filter information, and the current state of each echo canceller. Furthermore, information regarding other system modules such as codec encoders/decoders is kept for reference. State information is accessed by the function scheduling block 20. Function scheduling block 20 manages MIPS tracking, function ordering, and MIPS allocation and ensures that the total MIPS allocation remains within specified bounds.

Within the function scheduling block 20, MIPS tracking block 22 dynamically tracks an estimate of the MIPS used throughout the system so as to determine MIPS availability for all ECU instances as well as all ECU instance functions. As an example, the system tracks an estimate of codec MIPS, ISR MIPS, and voice channel state MIPS. Codec MIPS are allocated for each voice channel for codec operation. A lookup table is used to retain reference data for approximate MIPS consumed by the encoder and decoder. Voice channel state MIPS is the sum of all MIPS required by the system that are not associated with the ECU, codecs or ISRs. Voice channel state MIPS is a static number selected according to the system and platform and does not vary from data stored in the lookup table. Functionality included in the system state MIPS include tone detection, voice activity detection, and control. A lookup table is used to estimate MIPS consumption based on system states. The echo cancellation MIPS are echo removal, background filter adaptation, hybrid search processing, and foreground processing. To estimate the MIPS required for echo removal in a channel, $MIPS_{ER}$, the following formula is used:

$$MIPS_{ER} = aN_t + bN_s + c \qquad (1)$$

where $N_t$ is the number of taps of the foreground filter and $N_s$ is the number of distinct hybrid segments in the foreground filter. The coefficients a, b, and c are stored in an echo removal reference table. The coefficients a, b, and c are generated offline based on function profiling. Echo removal is always performed by all active ECU instances unless the ECU is turned off, therefore echo cancellation is always enabled and will consume MIPS during execution. The sum of these values are subtracted from total MIPS available for the specific core to determine the MIPS that remain for specific ECU functions. Information from the MIPS tracking block 22 is sent to the MIPS allocation block 26.

Function ordering block 24 uses an algorithm to determine instance priorities and order each of the instance functions in the ECU module. Ordering is performed using a round-robin scheme that prioritizes ECU instance functions that are grouped into queues.

Figure 4:
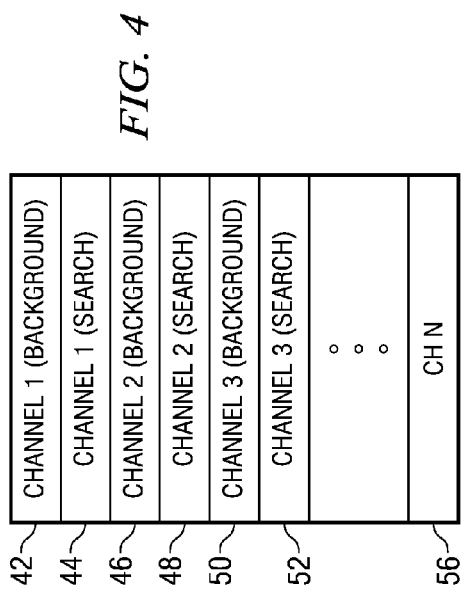
FIG. 4 is a block diagram of multiple channels of an echo cancellation unit.

FIG. 4 illustrates a block of communication channels, one through N, on a core where an echo cancellation module contemporaneously executes multiple echo cancellation instances. In the illustration, channel 1 is running a background filter update 42 and simultaneously running a hybrid search processing 44. Similarly, channels two and three each runs hybrid search processing 48 and background filter update 46. The system continues on to N channels 56 having N background updates and N search instances. All of the instance functions enter the round robin queues for prioritized execution.

Figure 5:
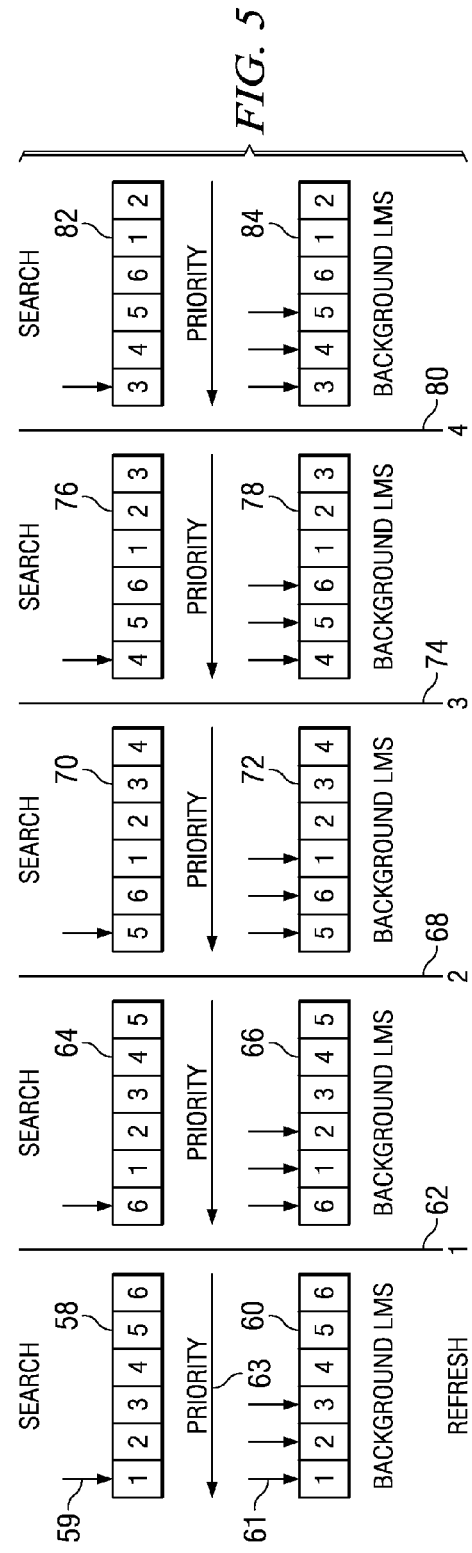
FIG. 5 is a diagram of a function scheduling queue for an echo cancellation unit.

FIG. 5 illustrates a series of two exemplary queues containing ECU functions. The priority slots in each queue correspond to ECU instance functions in each communication channel. Queue 58 contains hybrid search instance functions and queue 60 contains background filter adaptation instance functions. Prior to the first refresh 62, arrow 63 shows how the queues are ordered in terms of function priority, from highest priority at instance one to lowest priority at instance six. Function ordering block 24 circularly shifts each queue to the right at the refresh rate. The refresh rate may be every tick 28 period, or some multiple such as every Nth tick. At every refresh, the instance function in the highest priority position of each queue is enabled. A prescribed ratio is used determine how many instance functions the MIPS allocation block 26 will enable in each queue during each refresh. In the example using two queues, the number of enabled background filter adaptations to hybrid search updates is a ratio of three to one. As one skilled in the art will recognize, the ratio of enabled functions presented herein can vary. Instance functions in the lower priority positions are disabled if enabling the instance functions will result in exceeding the total MIPS allotted.

An exception to the MIPS allocation scheme described above is imposed by MIPS allocation block 26. In the exemplary embodiment, at least one search and at least one background instance are always enabled to prevent starvation of all similar echo cancellation instance functions due to a lack of available MIPS. If the MIPS in the system are fully utilized by modules or other MIPS consumers other than the ECU, and none are available for any echo cancellation functions, then no search or background filters will adapt and all ECU instances would fail to properly cancel echo. As long as at least one hybrid search and at least one background filter adaptation are operating, all ECU instances will continue to cancel echo, though the adaptations would occur more slowly while waiting for more MIPS to become available within the system.

Referring again to FIG. 5, the exemplary round-robin ordering scheme executes as follows. Prior to the first refresh 62, the instance with the highest priority in both the hybrid search function queue 58 and the background filter adaptation function queue 60 is instance one. The two queues are executed in a three-to-one ratio: three background function instances are enabled; for every hybrid search function instance. Arrow 59 designates the enabled instance one in search queue 58 and arrows 61 designate enabled instances one, two and three in background queue 60. Unless modified by one of the exceptions discussed herein, the two queues maintain this three-to-one ratio after every refresh. However the ratios between instance function queues can be modified and changed depending on the specific design needs of the system. After the first refresh 62, instance six in each queue 64, 66 moves to the highest priority position and is enabled. In search queue 64, instance six is now the only instance enabled, whereas in background queue 66 instances six, one, and two are enabled and instance three becomes disabled. After the second refresh 68, instance five in the hybrid search queue 70 circularly shifts to the highest priority and is enabled and instance six is subsequently disabled. Instance five in the background queue 72 is similarly shifted to the highest priority position and enabled and instance two is disabled. Similarly, after the third refresh 74, both queues 76, 78 circularly shift instance four from the lowest to highest priority position and enable it. Search queue 76 disables instance five, and background queue 78 disables instance one. Both queues 82, 84 are circularly shifted again after refresh four 80, moving instance three in each queue from lowest to highest priority. Hybrid search queue 82 enables instance three and disables instance four, and the background filter adaptation queue re-enables instance three and disables instance six. This leaves instances three, four, and five enabled in queue 84 and only instance three enabled in queue 82 in order to maintain the three-to-one ratio between the queues.

In addition to continually enabling and executing at least one search and at least one background LMS update instance functions, additional exceptions to the round-robin ordering scheme for the ECU functions are administered by MIPS allocation block 26. A second exception is that if the end of a queue is reached, wherein all instance functions are enabled in that queue, and instance functions in any remaining queue are not enabled, then functions in the remaining queues are enabled consecutively as long as MIPS are available. In this way, functionality is maximized in all ECU module instances by enabling as many instance functions as possible for all instances without performance suffering from inefficiencies caused by adhering to an ordering system that would prevent instance functions from enabling while MIPS were available to execute those functions.

A third and final exception to the MIPS allocation scheme occurs when available MIPS have been almost entirely allocated to ECU instance functions by the MIPS allocation block 26, and there are not enough MIPS to enable any more instance functions if the prescribed allocation ratio is followed. The MIPS allocation block 26 will instead enable instance functions in other function queues, if any are available that require fewer MIPS resources than the remaining available MIPS. For example, if after refresh three in FIG. 5 the available MIPS were insufficient to enable instance function five in the search queue, but enough to enable background function one in the background queue, then background instance one would be enabled out of order. Instance functions in the background queue would be continuously enabled in this manner until the available MIPS depleted.

The primary goal of the MIPS allocation 26 is to allow maximum aggregate ECU instance functionality while limiting the all ECU instances to operate within a MIPS budget. The MIPS allocation block 26 can also utilize the efficiencies of an ECU to redistribute MIPS. In echo cancellation, once a defined level of convergence/performance is achieved, hybrid search filter adaptation may not require frequent updating. In the search for optimum solutions in the ECU, the same number of steps can be implemented, except on a more infrequent basis. For example, in a system with ten communication channels, probabilities can be determined for the number of simultaneous calls active. Each ECU instance will need an initial MIPS allocation to search and identify the hybrid(s) as well as other MIPS allocations to cancel echo. The probability of all ECU instances requiring hybrid search filter adaptation on all ten channels simultaneously will be quite low, if not negligible. Because of the variation in speech and data in each communication channel, the ECU instances will not consume MIPS at the same rate, for example, a telephony channel falls silent no filter adaptation is necessary. MIPS that are allocated in blocks to each channel become over-allocated when telephony channels fall silent and require fewer processing resources. For example, if a background search in the echo canceller has achieved a level of convergence, the MIPS allocation becomes a low priority, thereby freeing MIPS for more appropriate functionality.

Because many varying and different embodiments may be made within the scope of the inventive concept herein presented, and because many modifications may be made in the embodiments herein detailed in accordance with the descriptive requirements of the law, it is to be understood that the details herein are to be interpreted as illustrative and not in a limiting sense.

What is claimed is:

1. A method for distributing processing resources for multiple instances of an echo canceller unit (ECU), comprising:

handling a plurality of externally generated echo canceller unit (ECU) instance events via a system interface;

interpreting the externally generated echo canceller unit (ECU) instance events and updating a local state information storage with data from the events;

determining from the local state information available processing resources for a plurality of echo canceller unit (ECU) instance functions;
prioritizing echo canceller unit (ECU) instances;
ordering each of plurality of echo canceller unit (ECU) instance functions;
placing echo canceller unit (ECU) instance functions into prioritized function queues; and
enabling the echo canceller unit (ECU) instances in each of the function queues following a prescribed ratio.

2. The method of claim 1, further comprising:
handling events into the system interface from codec encoder/decoder instances and communication channel state changes.

3. The method of claim 1, wherein:
the prioritized function queues comprise a background filter adaptation queue and a hybrid search queue.

4. The method of claim 1, wherein:
prioritizing echo canceller instance functions is performed via an N element circular shift of each function queue, where N is the number of currently running echo canceller unit (ECU) instance functions.

5. The method of 1, further comprising:
utilizing remaining processing resources after enabling all possible echo canceller unit (ECU) instance functions according to the prescribed ratio by enabling any remaining echo canceller unit (ECU) instance functions based on the processing resource requirements of each remaining echo canceller unit (ECU) instance functions.

6. The method of claim 1, further comprising:
enabling at least the highest priority echo cancellation unit (ECU) instance function from each function queue at all time periods.

7. The method of claim 1, further comprising:
performing an asynchronous reallocation of processing resources when an event occurs that results in the combined processing resources of all software module instance functions exceeding the available processing resources.

8. The method of claim 1, further comprising:
repeating prioritizing echo canceller unit (ECU) instances and allocating the available processing resources at a configurable time period.

9. The method of claim 8, further comprising:
enabling at least the highest priority echo cancellation unit (ECU) instance function from each function queue at all time periods.

10. The method of claim 1, further comprising:
performing an asynchronous reallocation of processing resources when an event occurs that results in the combined processing resources of all enabled echo canceller unit (ECU) instance functions exceeding the available processing resources.

11. The method of claim 1, wherein:
determining the available processing resources for echo canceller unit (ECU) instance functions includes tracking an estimate of the available processing resources by subtracting the sum of the following from the total available processing resources;
codec encoder/decoder processing resource requirements estimate;
communication channel state processing resource requirements estimate;
echo removal processing resources estimate;
echo canceller unit (ECU) overhead processing resource requirements estimate; and
interrupt service routine processing resources estimate.

12. The method of claim 11, wherein:
the codec encoder/decoder processing requirements are determined via codec encoder/decoder lookup tables; and
the communications channel state processing resource requirements are determined via a channel state lookup table.

13. The method of claim 11, wherein:
the estimated echo removal processing resource requirements are determined from the following formula:

$$MIPS=aNt+bNs+c$$

where MIPS are millions of instructions per second, Nt is the number of filter taps in a foreground filter, Ns is the number of hybrid segments of the foreground filter, and the constants a, b, and c are generated offline based on function profiling and stored in a reference table.

14. The method of claim 1, further comprising:
tracking estimated processing resource requirements of each echo canceller unit (ECU) instance function based upon the state of the instance function.

15. The method of claim 14, wherein:
the estimated processing resource requirements of the echo canceller unit (ECU) instance functions for background filter adaptation is obtained from the following formula:

$$MIPS=aNt+bNs+c$$

where MIPS are millions of instructions per second, Nt is the of the number of taps in a background filter, Ns is the number of segments in the background filter, and the constants a, b, and c are generated offline based on function profiling and stored in a reference table.

16. The method of claim 14, wherein:
the estimated processing resource requirements of the echo canceller unit (ECU) instance functions for hybrid searches is obtained from the following formula:

$$MIPS=aNt+b$$

where MIPS are millions of instructions per second, Nt is the of the number of taps in a search filter, and constants a and b are generated offline based on function profiling and stored in a reference table.

17. A method for distributing processing resources for multiple instances of a same software module running on a processing core of a digital signal processor (DSP), comprising:
handling a plurality of externally software module instance events via a system interface;
interpreting the externally generated software module instance events and updating a local state information storage with data from the events;
determining from the local state information available processing resources for a plurality of software module instance functions;
prioritizing instances on a function by function basis;
ordering each of plurality of software module instance functions;
placing software module instance functions into prioritized function queues; and enabling the software module instances in each of the function queues following a prescribed ratio.

18. The method of claim 17, further comprising:
handling events into the system interface from codec encoder/decoder instances and communication channel state changes.

19. The method of 17, further comprising:
utilizing remaining processing resources after enabling all possible software module instance functions according to the prescribed ratio by enabling any remaining software module instance functions based on the processing resource requirements of each remaining software module instance functions.

20. The method of claim 17, further comprising:
enabling at least the highest priority software module instance function from each function queue at all time periods.

21. The method of claim 17, further comprising:
repeating prioritizing software module instances and allocating the available processing resources at a configurable time period.

22. The method of claim 21, further comprising:
enabling at least the highest priority software module instance function from each function queue at all time periods.

23. The method of claim 17, wherein:
determining the available processing resources for the software module instance functions includes tracking an estimate of the available processing resources by subtracting the sum of the following from the total available processing resources;
codec encoder/decoder processing resource requirements estimate;
communication channel state processing resource requirements estimate; and
interrupt service routine processing resources estimate.

24. The method of claim 23, wherein:
the codec encoder/decoder processing requirements are determined via codec encoder/decoder lookup tables; and
the communications channel state processing resource requirements are determined via a channel state lookup table.

* * * * *